(No Model.)  3 Sheets—Sheet 2.
S. D. TUCKER.
MACHINE FOR TRIMMING STEREOTYPE PLATES.
No. 271,380. Patented Jan. 30, 1883.
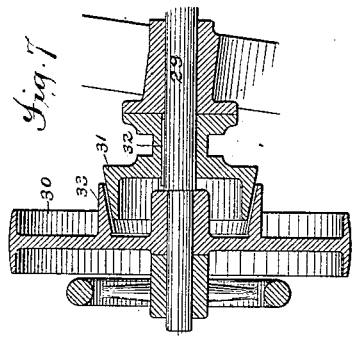
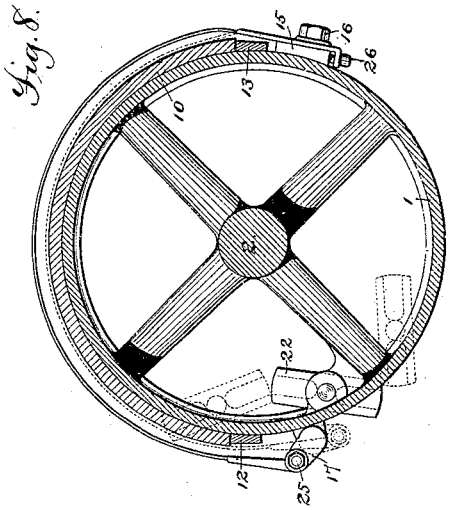
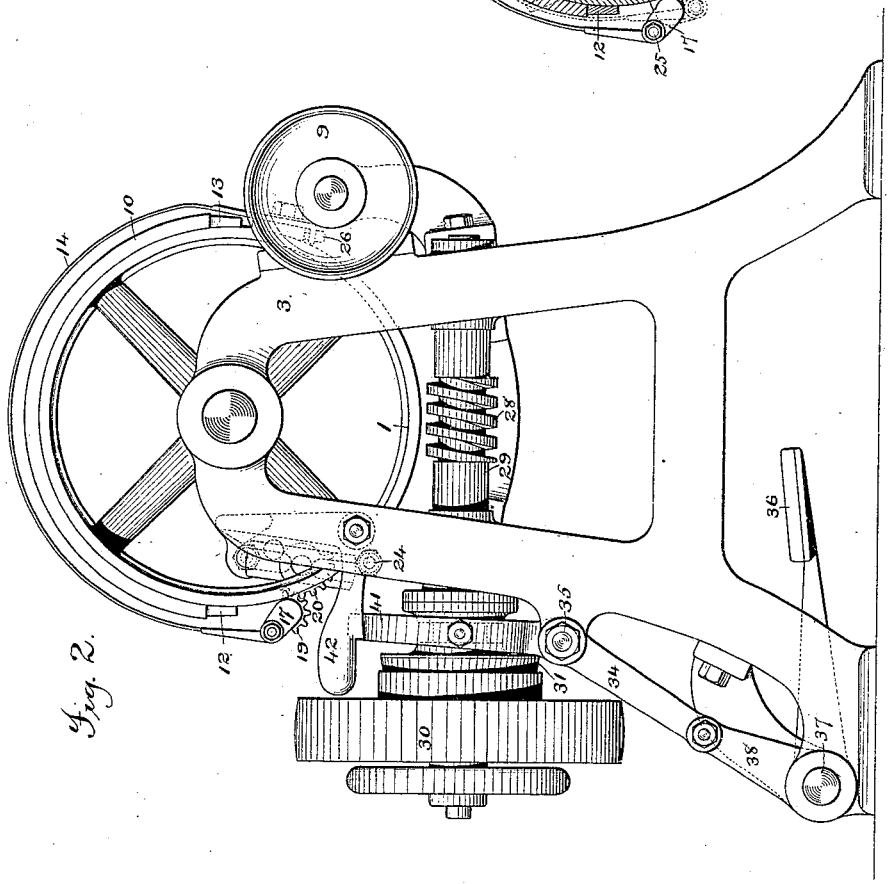
Witnesses:
Inventor:
Stephen D. Tucker,
by Munson & Philipp
Attys.

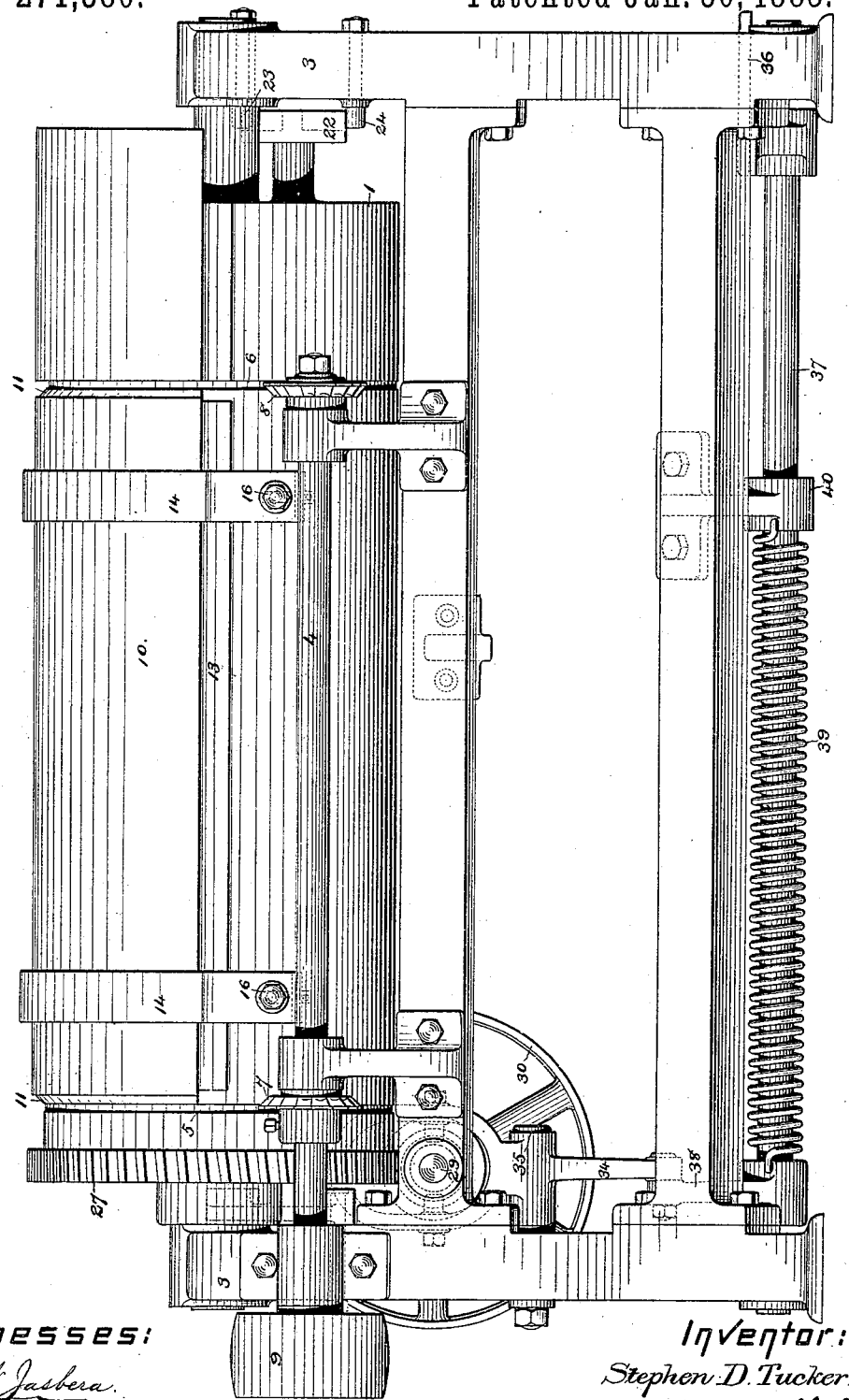

(No Model.) 3 Sheets—Sheet 3.

S. D. TUCKER.
MACHINE FOR TRIMMING STEREOTYPE PLATES.

No. 271,380. Patented Jan. 30, 1883.

Witnesses:
A. N. Jasbera
J. T. Moory

Inventor:
Stephen D. Tucker,
by Munson Philipp
Attys.

UNITED STATES PATENT OFFICE.

STEPHEN D. TUCKER, OF NEW YORK, N. Y.

MACHINE FOR TRIMMING STEREOTYPE-PLATES.

SPECIFICATION forming part of Letters Patent No. 271,380, dated January 30, 1883.

Application filed March 31, 1882. (No model.)

*To all whom it may concern:*

Be it known that I, STEPHEN D. TUCKER, a citizen of the United States, residing in the city of New York, county of New York, and State of New York, have invented certain new and useful Improvements in Stereotype-Plate-Trimming Machines, fully described and represented in the following specification and the accompanying drawings, forming a part of the same.

The present invention relates to a rotary mechanism for automatically trimming and shaping the edges of stereotype-plates to reduce them to the proper size and form to be secured to the cylinder of a printing-machine. Such a mechanism consists primarily of a rotating drum or cylinder upon which the rough stereotype-plate is clamped, and which, as it revolves, carries the plate into contact with revolving cutters, which trim it to the proper dimensions and bevel its edges, so that they will fit under the clamps of the plate-cylinder of the printing-machine.

In machines of this class as heretofore constructed the plate has been secured to the carrier by means of screws or other devices, which were operated by hand to clamp and release the plate, which operation necessarily involved considerable labor and the loss of time, which latter is of greatest importance in the production of stereotype-plates for newspapers.

It is the object of the present invention, among other things, to save the labor and loss of time incident to this method of securing the plate to its carrier; and to that end the invention consists primarily in devices by which the plate is automatically clamped to and released from the carrier.

It also consists in devices by which the machine is automatically stopped when the carrier comes to the proper position for the removal of the trimmed plate.

It also consists in certain other details of construction and combinations of parts, all of which will be hereinafter fully explained in detail.

Figure 6:
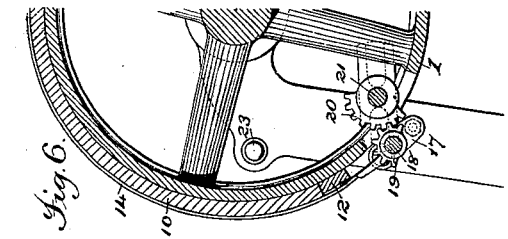
Figure 5:
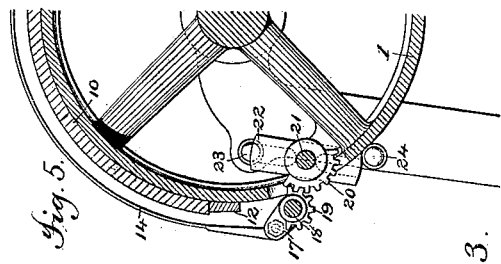
Figure 4:
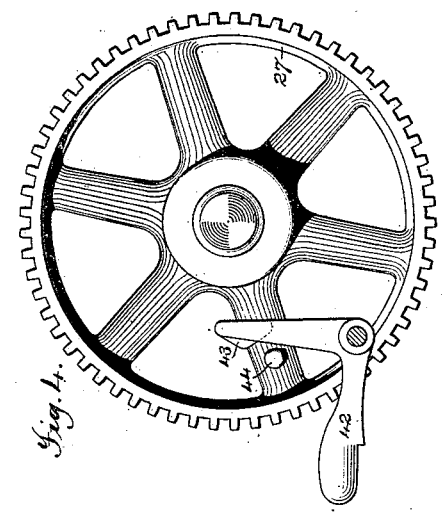
Figure 3:
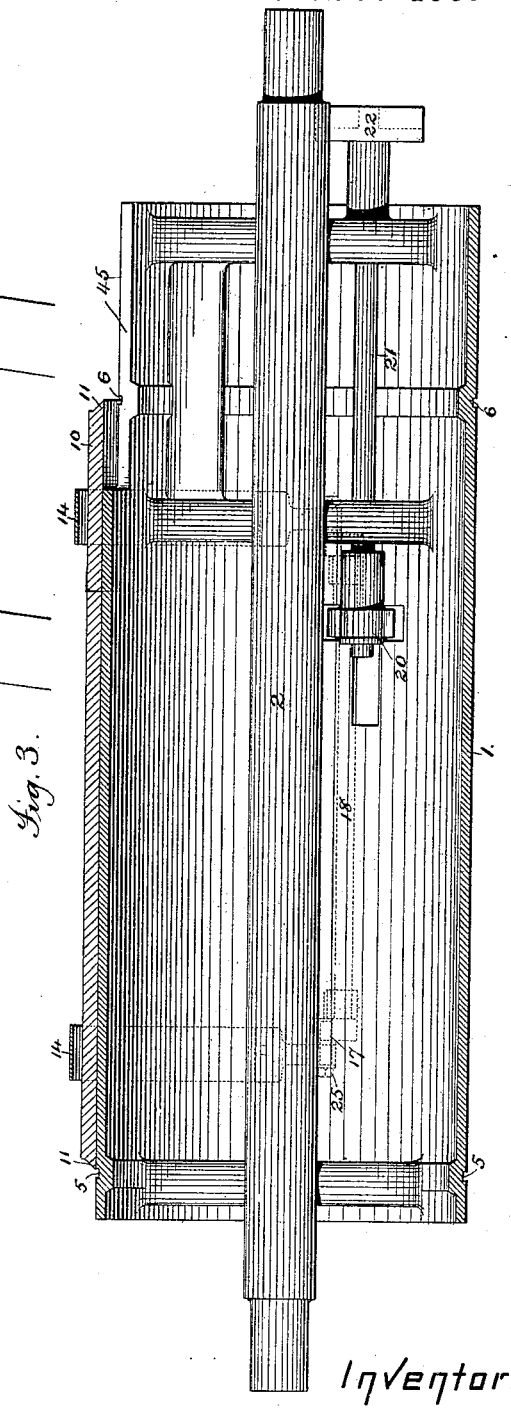

In said drawings, Figure 1 is a side elevation of a mechanism embodying the present invention. Fig. 2 is an end elevation of the same. Fig. 3 is a longitudinal section of the carrying-cylinder. Figs. 4 to 8, inclusive, show details to be hereinafter referred to.

As hereinbefore stated, the machine consists primarily of the drum or cylinder 1, the shaft 2 of which is mounted in bearings in a suitable end frame, 3, as in Figs. 1 and 2. This cylinder is provided at the proper points with circumferential grooves 5 6, into which enter slightly the rotating cutters 7 8, which are fixed upon the shaft 4, mounted in suitable bearings in the frame of the machine at one side of the cylinder, as shown in Figs. 1 and 2, and driven in any suitable manner—as, for instance, by a belt passing around the pulley 9. (Shown in the drawings.) As the cylinder 1, carrying the stereotype-plate 10, is slowly revolved, which may be accomplished by a crank attached to its shaft, or by the devices shown, as will be presently explained, the cutters 7 8, being driven rapidly, as they are in practice, will cut off the upper unsound end and trim off the edges of the plate, reducing it to the proper size, and at the same time beveling its edges 11, as shown in Fig. 1.

To enable the plate to be easily and quickly placed upon and clamped to and released and removed from the cylinder, and to hold it securely and in proper position while being trimmed, the cylinder and frame are provided with the following devices: To aid in placing the plate and prevent it from shifting circumferentially when on the cylinder, the latter is provided with the stop-bars 12 13, against which the edges of the plate rest. These stop-bars may be adjustable, so as to adapt the cylinder to carry plates of varying sizes. The plate to be trimmed, having been placed in position, is clamped to the cylinder by the metallic straps or bands 14. These bands, of which there may be one, two, or more, have one end secured to projections 15 upon the surface of the cylinder by means of bolts 16. The other ends of the bands are secured to studs 25, fast to the ends of arms 17, extending from the rock-shaft 18, which is mounted in bearings fast to the surface of the cylinder. (See Figs. 3 and 8.) The shaft 18 is also provided with the segmental gear 19, which engages with a like gear, 20, upon the rock-shaft 21, mounted in bearings upon the interior of the cylinder, and carrying upon its outer end the grooved cross-head 22, which, as the cylinder revolves, engages alternately with the studs 23 24, fixed to the frame of the machine.

The parts just described being adjusted with relation to each other so that the plate-carrying portion of the cylinder is uppermost and the bands are loosened, as shown in Fig. 2, and a plate having been placed upon the cylinder beneath the bands, the operation will be as follows: The cylinder will be revolved to the left, when the stud 24 (see Fig. 5) will at once enter one of the grooves in the cross-head 22 and turn said cross-head to the position shown in Fig. 6 and in dotted lines in Fig. 8, thereby, through shaft 21, segmental gears 19 20, and rock-shaft 18, throwing the arms 17 to the position shown in Fig. 6, and in dotted lines in Fig. 8, by which the bands 14 will be drawn tightly against the plate, clamping it securely to the cylinder. It is to be observed that when the arms 17 are in this latter position the studs 25 are brought so close to the periphery of the cylinder that the bands 14 pass slightly inside of the center of shaft 18, so that the tension of the bands will tend to draw the arms 17 inward instead of outward, thereby bringing and holding the arms against the cylinder and locking the bands 14 upon the plate. The cylinder, continuing its revolution, carries the plate around and upward past the cutters 7 8, by which its outer end is cut off, its edges are trimmed and beveled, and just as the cylinder completes a revolution the stud 23 will enter the other groove in the cross-head 22, thereby rocking said cross-head back to its original position, (see Fig. 5,) and through the connections already described loosening the bands, so that the end cut off and the plate can be readily removed.

To provide for the lengthening or shortening of the bands 14, so that they shall be drawn tightly upon the plate by the movement of the arms 17, the holes through which the bolts 16 pass are elongated, as shown in Fig. 1, and by loosening said bolts the length of the bands can be adjusted very accurately by means of the set-screws 26, which pass through the downwardly-turned ends of the bands and abut against the projections 15.

As hereinbefore stated, the cylinder 1 may be rotated by hand by means of a crank or other suitable device; but in the present case it is shown as provided with devices for driving it by a belt connecting it with any convenient source of power. To effect this the shaft 2 of the cylinder 1 is provided with the worm-wheel 27, in which works the worm 28, the shaft 29 of which is supported in bearings in the side braces of the frame of the machine. One end of the worm-shaft 29 projects beyond its bearing, which projecting end carries a loose pulley, 30, and a clutch mechanism by which said pulley may be clutched to the shaft at the will of the operator. This clutch mechanism, which may be of any approved construction, is shown in the present case as a friction-clutch, and is composed of the conical head 31, which is permitted to slide upon the shaft 29, but is made to revolve with said shaft by means of the recess and feather 32. (See Fig. 7.) The head 31 coacts with the conical recess 33 of the pulley, by which the two may be clutched together to set the cylinder in motion when desired.

The clutch just described is operated by the lever 34, fulcrumed near its middle upon the stud 35, and having its upper end formed into a yoke, 41, which embraces the head 31. The lever 34 receives motion from the treadle 36, through the rock-shaft 37 and arm 38, the latter of which is connected to the lower end of the said lever 34, as shown in Figs. 1 and 2. The shaft 37, as shown in Fig. 1, is provided with a spiral spring, 39, one end of which is secured to the shaft and the other to a bracket, 40, fast to the frame of the machine. The tendency of this spring is to hold the treadle in an elevated position, as shown in Fig. 2, and consequently to keep the pulley 30 unclutched from the shaft 29 and the machine idle. When the plate to be trimmed has been placed in position on the top of the cylinder, the treadle will be depressed by the foot of the operator, thereby, through the connections just described, clutching the pulley 30 and shaft 29 together and putting the cylinder in motion, and, as hereinbefore described, clamping the plate to the cylinder. When the head 31 is thrown outward into position to clutch the pulley 30, the weighted dog 42, which is pivoted to the frame of the machine and rests upon the yoke 41, will drop behind the said yoke and hold the clutch in position. In order, however, that the machine shall be stopped when the trimming is completed and the plate has arrived in proper position for removal, the dog 42 is made in the form of a bell-crank lever, the rearwardly and upwardly extending arm of which is provided with a cam-projection, 43, which at the proper time is struck by the stud 44, upon one of the arms of the worm-wheel 27, whereby the dog will be raised, when the action of the spring 39 will withdraw the head 31 and the machine will stop.

The cylinder or carrier in machines of this class as heretofore constructed has had a continuous or solid surface, and since, after trimming, the edge of the plate does not extend beyond the carrier at either end, it was found difficult to remove the plate, as there was no convenient way to grasp it. This difficulty is avoided in the present machine by providing the cylinder with a broad slot, 45, which extends inward from the end to a point somewhat beyond the path of the cutter 8, (see Fig. 3,) and is of sufficient width to receive the hand of the operator, so that after the trimming is completed the edge of the plate may be readily grasped to withdraw it from the carrier.

What I claim is—

1. The combination, with a rotary plate-carrier, as 1, of plate-clamping devices which are operated by the movement of said carrier to clamp the plate at the proper time, all substantially as described.

2. The combination, with a rotary plate-carrier, as 1, of plate-clamping devices which are operated by the movement of said carrier to release the plate at the proper time, all substantially as described.

3. The combination, with a rotary plate-carrier, as 1, of plate-clamping devices which are operated by the movement of said carrier to clamp and release the plate at the proper times, all substantially as described.

4. The combination, with a rotary plate-carrier, as 1, of cutters for trimming the plate and devices operated by the movement of said carrier to arrest the same at the proper point for placing and removing the plate, all substantially as described.

5. The combination, with a rotating plate-carrier, as 1, of plate-clamping devices and arresting devices which are operated by the movement of said carrier to clamp and release the plate and arrest the carrier at the proper times, all substantially as described.

6. The combination, with a rotating plate-carrier, as 1, of plate-clamping bands, as 14, and devices connected therewith which are operated by the movement of said carrier to clamp and release the plate at the proper times, all substantially as described.

7. The combination, with the rotating plate-carrier, of the stops, as 12 13, the bands, as 14, and means for operating the latter to automatically clamp and release the plate, all substantially as described.

8. The combination, with the carrier, of the bands, as 14, secured to the arms of the rock-shaft 18, and means for automatically rocking said shaft, all substantially as described.

9. The combination of the carrier 1, bands 14, rock-shaft 18, having arms 17, cross-head 22, studs 23 24, and means for connecting said cross-head and rock-shaft, all substantially as described.

10. In a stereotype-plate-trimming machine, a rotating carrier, as 1, provided with the slot, as 45, extending inward beyond the end of the trimmed plate, as and for the purpose set forth.

In testimony whereof I have hereunto set my hand in the presence of two subscribing witnesses.

STEPHEN D. TUCKER.

Witnesses:
J. A. HOVEY,
GEO. H. GRAHAM.